US009327838B2

(12) United States Patent
Nguyen

(10) Patent No.: US 9,327,838 B2
(45) Date of Patent: May 3, 2016

(54) ON-BLADE DEICE HEATER MAT

(71) Applicant: Sikorsky Aircraft Corporation, Stratford, CT (US)

(72) Inventor: Dean Nguyen, Greenwich, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 238 days.

(21) Appl. No.: 13/893,995

(22) Filed: May 14, 2013

(65) Prior Publication Data
US 2014/0339366 A1 Nov. 20, 2014

(51) Int. Cl.
*B64D 15/12* (2006.01)
*B64C 27/473* (2006.01)
*H05B 3/34* (2006.01)

(52) U.S. Cl.
CPC .............. *B64D 15/12* (2013.01); *B64C 27/473* (2013.01); *H05B 3/345* (2013.01); *H05B 2203/002* (2013.01); *H05B 2203/011* (2013.01); *H05B 2203/014* (2013.01); *H05B 2214/02* (2013.01)

(58) Field of Classification Search
CPC ..................... H05B 2203/015; H05B 2214/02; H05B 3/345; B64C 27/473
See application file for complete search history.

(56) References Cited

U.S. PATENT DOCUMENTS

| | | | | |
|---|---|---|---|---|
| 975,359 A | * | 11/1910 | Hefter | 219/549 |
| 2,670,620 A | * | 3/1954 | Goldstaub | 66/195 |
| 2,967,415 A | * | 1/1961 | Ford et al. | 66/193 |
| 3,218,436 A | * | 11/1965 | Edwards et al. | 219/544 |
| 3,472,289 A | * | 10/1969 | Riordan et al. | 139/425 R |
| 3,478,422 A | * | 11/1969 | Inui | 29/611 |
| 4,518,640 A | * | 5/1985 | Wilkens | 428/102 |
| 4,841,124 A | * | 6/1989 | Cox et al. | 219/201 |
| 4,983,814 A | * | 1/1991 | Ohgushi et al. | 219/545 |
| 5,484,983 A | * | 1/1996 | Roell | 219/545 |
| 5,533,789 A | * | 7/1996 | McLarty et al. | 297/452.64 |
| 5,795,835 A | * | 8/1998 | Bruner et al. | 442/310 |
| 6,160,246 A | * | 12/2000 | Rock et al. | 219/545 |
| 6,294,770 B1 | * | 9/2001 | Hasegawa et al. | 219/544 |
| 6,373,034 B1 | * | 4/2002 | Rock et al. | 219/545 |
| 6,414,286 B2 | * | 7/2002 | Rock et al. | 219/545 |
| 6,576,115 B2 | * | 6/2003 | Petrenko | 205/628 |
| 6,723,967 B2 | * | 4/2004 | Rock et al. | 219/528 |

(Continued)

FOREIGN PATENT DOCUMENTS

WO WO 2008013459 A2 * 1/2008 ............... H05B 3/34

OTHER PUBLICATIONS

Dr. S. Raz, "The Karl Mayer Guide to Technical Textiles." Edited by Karl Mayer Textilmaschinenfabrik GmbH (2000).*

(Continued)

*Primary Examiner* — Philip J Bonzell
*Assistant Examiner* — Michael Kreiner
(74) *Attorney, Agent, or Firm* — Cantor Colburn LLP

(57) ABSTRACT

A heater mat for a rotor blade includes a plurality of electrically conductive heater wires extending in a path along a span of the rotor blade and a plurality of yarn thread knitted to the plurality of heater wires, each of the yarn threads looping around at least one of the plurality of heater wires. A warp thread is positioned between adjacent heater wires and knitted to adjacent pairs of the yarn threads without looping around the plurality of heater wires, to maintain spacing between adjacent heater wires of the plurality of heater wires. An electrical current flowed through the plurality of heater wires inhibits ice accumulation on the rotor blade assembly.

25 Claims, 3 Drawing Sheets

(56) References Cited

U.S. PATENT DOCUMENTS

| | | | |
|---|---|---|---|
| 6,832,742 B2* | 12/2004 | Petrenko et al. | 244/134 R |
| 6,856,715 B1* | 2/2005 | Ebbesen et al. | 385/14 |
| 7,038,177 B2* | 5/2006 | Rock | 219/529 |
| 7,585,156 B2* | 9/2009 | Oldroyd | 416/230 |
| 2002/0096506 A1* | 7/2002 | Moreland et al. | 219/202 |
| 2010/0117537 A1* | 5/2010 | Horppu et al. | 315/76 |
| 2010/0162565 A1* | 7/2010 | Mukherji et al. | 29/889.1 |
| 2011/0290784 A1* | 12/2011 | Orawetz et al. | 219/486 |
| 2013/0032268 A1* | 2/2013 | Cinget et al. | 152/542 |
| 2013/0168382 A1* | 7/2013 | Teramoto et al. | 219/529 |
| 2014/0374404 A1* | 12/2014 | Matsumoto | 219/549 |

OTHER PUBLICATIONS

Dean Nguyen et al., "Development of an Improved Deice System for UH-60 Rotor Blades"; American Helicopter Society 66th Annual Formum, Phoenix, AZ; May 11-13, 2010; 11 pages.

* cited by examiner

ON-BLADE DEICE HEATER MAT

FEDERAL RESEARCH STATEMENT

This invention was made with Government support under Agreement No. W911W6-08-2-0006 with the Army. The Government has certain rights in the invention.

BACKGROUND

The subject matter disclosed herein generally relates to rotors for rotor craft use. More specifically, the subject disclosure relates to on blade heaters for rotor craft.

Electrical heaters have long been used as deicers or ice-prevention mechanisms on aircraft, in order to prevent excessive ice accumulation on wing or other fixed surfaces of the aircraft, such as engine cowlings, as ice accumulation can have negative, in some cases catastrophic, effects on aircraft performance.

Heaters for rotating components, such as helicopter rotor blades have been used with some success, but the cyclical forces applied to the heaters due to the rotation increases fatigue on elements of the heater, which can result in failure of the heater.

BRIEF DESCRIPTION

In one embodiment, a rotor blade assembly includes a rotor blade and a heater mat secured to the rotor blade. The heater mat includes a plurality of electrically conductive heater wires extending in a path along a span of the rotor blade and a plurality of yarn thread knitted to the plurality of heater wires, each of the yarn threads looping around at least one of the plurality of heater wires. A warp thread is positioned between adjacent heater wires and knitted to adjacent pairs of the yarn threads without looping around the plurality of heater wires, to maintain spacing between adjacent heater wires of the plurality of heater wires. An electrical current flowed through the plurality of heater wires inhibits ice accumulation on the rotor blade assembly.

In another embodiment, a heater mat for a rotor blade includes a plurality of electrically conductive heater wires extending in a path along a span of the rotor blade and a plurality of yarn thread knitted to the plurality of heater wires, each of the yarn threads looping around at least one of the plurality of heater wires. A warp thread is positioned between adjacent heater wires and knitted to adjacent pairs of the yarn threads without looping around the plurality of heater wires, to maintain spacing between adjacent heater wires of the plurality of heater wires. An electrical current flowed through the plurality of heater wires inhibits ice accumulation on the rotor blade assembly.

In yet another embodiment, a rotary winged aircraft includes an airframe, a drive system disposed at the airframe, and a rotor assembly operably connected to the drive system. The rotor assembly includes a rotor hub and a plurality of rotor blade assemblies extending from the rotor hub. A rotor blade assembly of the plurality of rotor blade assemblies includes a rotor blade and a heater mat secured to the rotor blade. The heater mat includes a plurality of electrically conductive heater wires extending in a path along a span of the rotor blade and a plurality of yarn thread knitted to the plurality of heater wires, each of the yarn threads looping around at least one of the plurality of heater wires. A warp thread is positioned between adjacent heater wires and knitted to adjacent pairs of the yarn threads without looping around the plurality of heater wires, to maintain spacing between adjacent heater wires of the plurality of heater wires. An electrical current flowed through the plurality of heater wires inhibits ice accumulation on the rotor blade assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
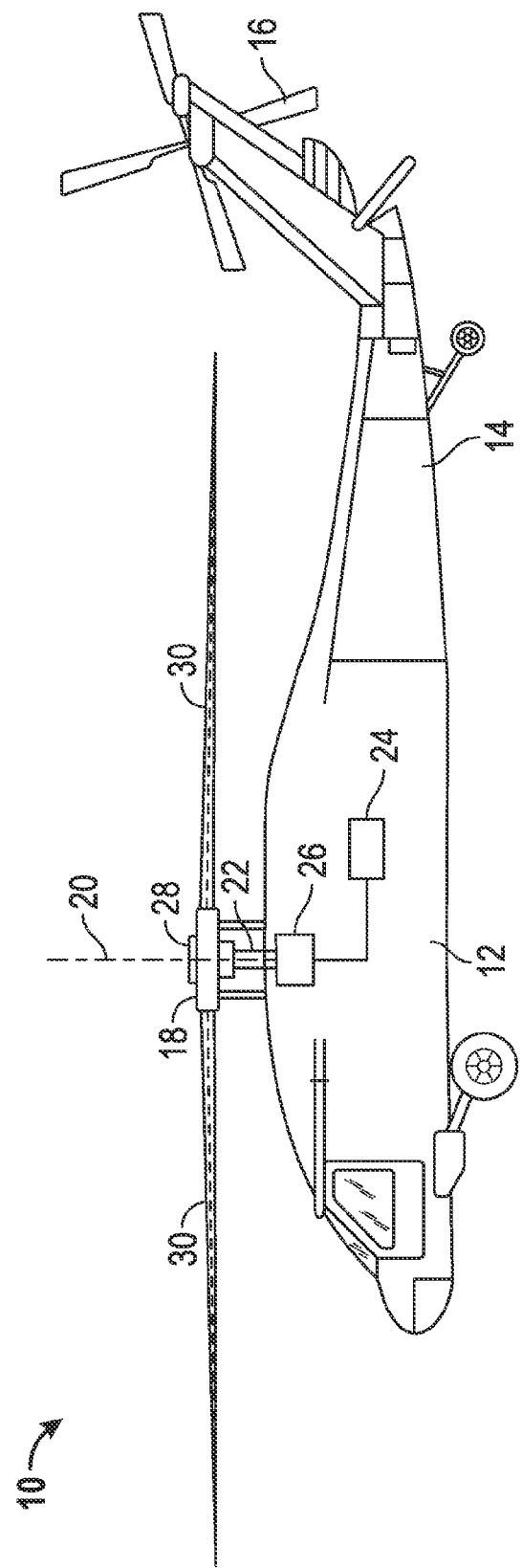
FIG. 1 is illustration of an embodiment of an aircraft.

Shown in FIG. 1 is a schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft, such as dual coaxial rotor craft. A main rotor assembly 18 is located at the airframe 12 and rotates about a main rotor axis 20. The main rotor assembly 18 is driven by a drive shaft 22 connected to a power source, for example, an engine 24 by a gearbox 26. The main rotor assembly 18 includes a rotor hub 28 located at the main rotor axis 20 and operably connected to the drive shaft 22. A plurality of blade assemblies 30 are connected to the rotor hub 28. While shown in a conventional single rotor configuration, it is understood that aspects can be used in coaxial rotor configurations such as the X2® helicopter.

Figure 2:
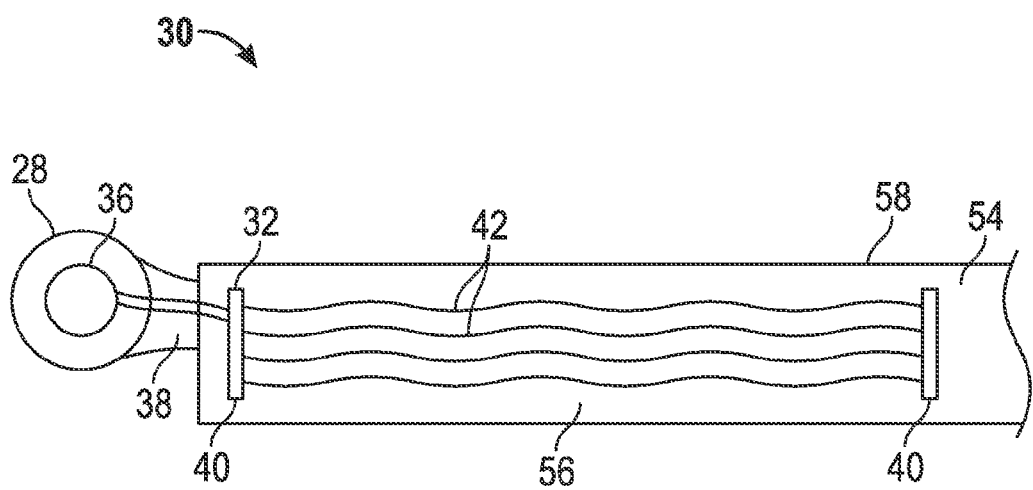
FIG. 2 is an illustration of an embodiment of a rotor blade assembly.

Referring now to FIG. 2, one or more of the blade assemblies 30 includes a heater mat 32 affixed to a rotor blade 54. The heater mat 32 may be mechanically secured to the rotor blade 54 via, for example, screws or other fasteners, and/or via adhesives. Further, in some embodiments, the heater mat 32 may be embedded in, or formed integral to, components of the rotor blade 54, for example, outer skin 56 of the rotor blade 54. The heater mat 32 is attached to an electrical power supply (not shown), in some embodiments located at the airframe 12. The attachment may be achieved via a slip ring 36 at the rotor hub 28 with a plurality of leads 38 extending from the slip ring 36 to the heater mat 32 at, for example, a buss bar 40. The heater mat 32 includes a plurality of conductive heater wires 42 extending from the buss bar 40 spanwise along the blade assembly 30. The buss bar 40 is a termination point of the heater mat 32, and the plurality of heater wires 42 are electrically connected thereto. As such, the heater wires 42 extend substantially parallel with each other, although it is understood that other patterns can be used so long as the heater wires 42 do not overlap each other. When an electrical current is flowed through the heater wires 42 from the power supply (not shown), the flow generates heat to melt ice accumulation on the blade assembly 30 and/or prevent ice accumulation on the blade assembly 30.

Figure 3:
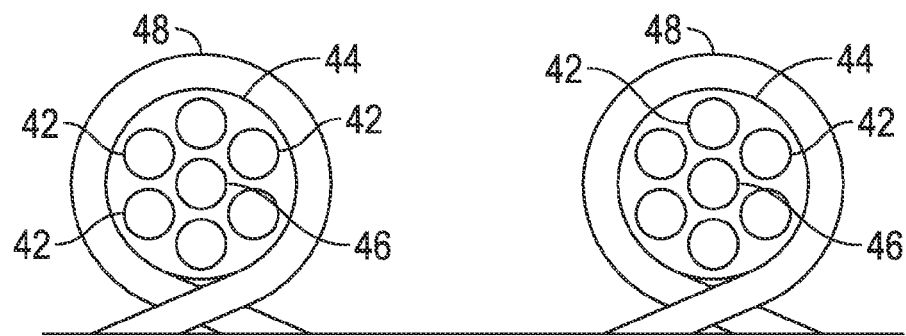
FIG. 3 is an illustration of an embodiment of a heater wire arrangement for an embodiment of a rotor blade assembly.

Referring to FIG. 3, the heater wires 42 may be grouped heater wire bundles 44. For example, a heater wire bundle 44 may include six individual heater wires 42 wound or braided into the heater wire bundle 44. Further, the heater wire bundle 44 may include other members, such as a non-conductive bundle core 46. While not shown, a non-conductive covering could be used to surround the wires 42 and protect the wires 42 within the bundle 44. However, it is understood that the wires 42 need not be so grouped and/or insulated in all aspects.

Referring again to FIG. 2, the shown heater wire bundles 44 extend from the buss bar 40 in a curvilinear path. In some embodiments, the curvilinear path is a sinusoidal wave pattern. The shown path acts to relieve stress as the assembly 30 spins. However, it is understood that the path could be non-curvilinear, or linear if stress is relieved in other ways or is nominal in a particular embodiment.

Figure 4:
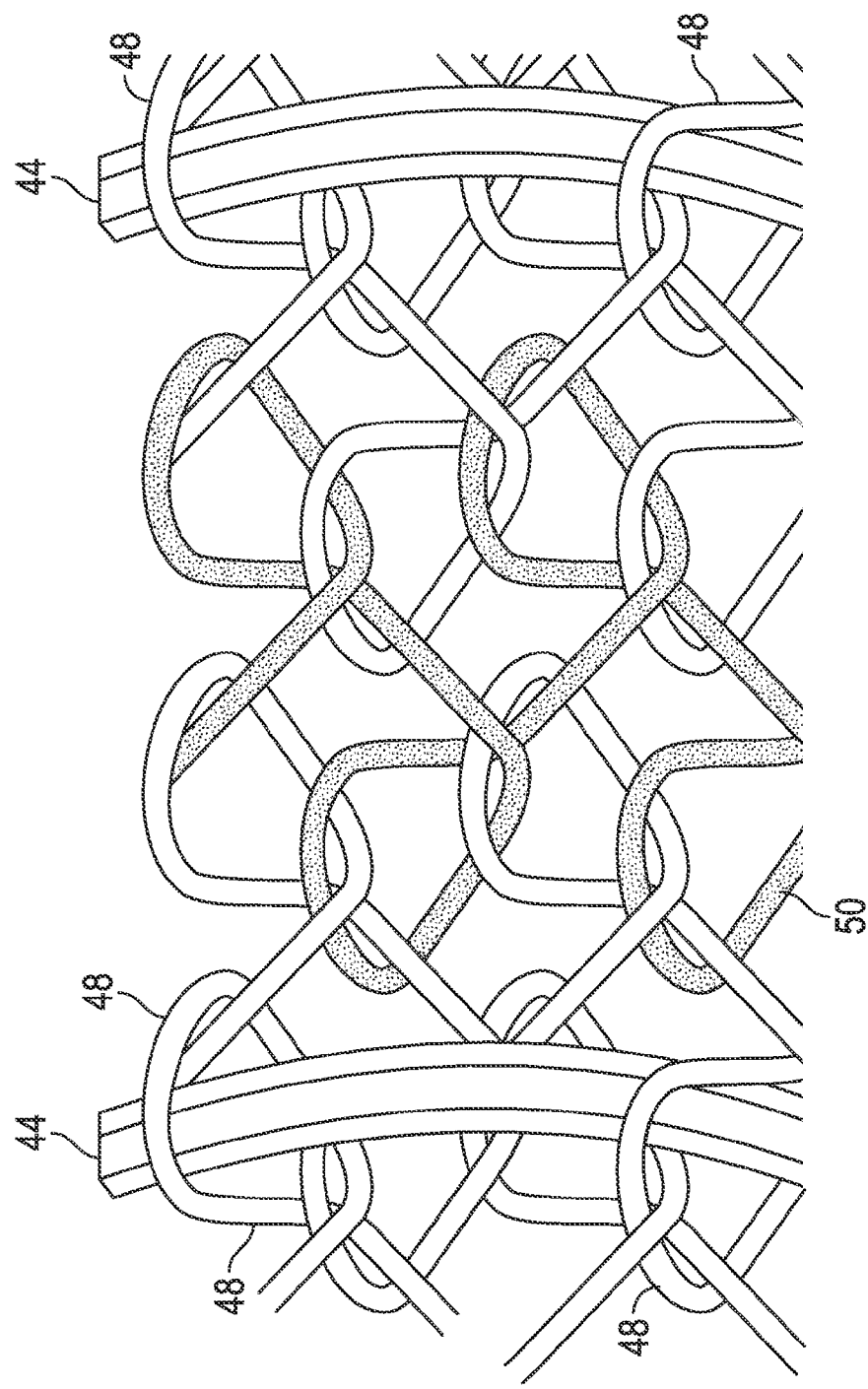
FIG. 4 is an illustration of an embodiment of a heater mat.

Multiple wire bundles 44 extend from the buss bar 40 substantially parallel to each other. In some embodiments, a second buss bar 40 is located at a terminal end 58 of the heater mat 32 such that the wire bundles 44 extend between the two buss bars 40. However, it is understood that other mechanisms can be used to complete the circuit at the terminal end 58. The heater wires 42 are secured to the buss bars 40 by, for example, ultrasonic welding. Referring to FIG. 4, a plurality of yarn threads 48 are knitted around the wire bundles 44. As shown, where the yarn thread 48 encounters a wire bundle 44, the yarn thread 48 loops around the wire bundle 44 as shown in FIG. 3 in order to secure the bundle 48. In some embodiments, the yarn threads 48 are formed from nylon and glass fibers, but can be any mechanism which prevents the movement of the bundles 44 relative to each other. A second thread 50, referred to as a warp thread 50, is located between parallel wire bundles 44 and knitted into the yarn threads 48 without crossing over or looping around the wire bundles 44. The warp thread 50 can be of the same material as the yarn thread 48, but need not be the same in all aspects. The warp threads 50 are utilized to retain adjacent yarn threads 48 thus maintaining a spacing between the wire bundles 44 while the rotor assembly 30 turns, preventing electrical short if the wire bundles 44 move too close together due to the action of the turning, and preventing excessive strain on and fatigue failure of the wire bundles 44 due to motion thereof when subjected to forces during operation of the helicopter 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, while shown in the context of a rotor blade, aspects could be used on propellers or other blades (such as windmills or ship propellers) which are subjected to icing conditions. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:
1. A rotor blade assembly comprising:
a rotor blade; and
a heater mat secured to the rotor blade, the heater mat including:
a plurality of electrically conductive heater wires extending in a path along a span of the rotor blade;
a plurality of yarn thread knitted to the plurality of heater wires, each of the yarn threads looping around at least one of the plurality of heater wires; and
a warp thread disposed between two adjacent heater wires of the plurality of heater wires and knitted to adjacent pairs of the yarn threads without looping around the plurality of heater wires, each warp thread knitted to at least a first yarn thread wrapped around a first adjacent heater wire of the two adjacent heater wires and a second yarn thread wrapped around a second adjacent heater wire of the two adjacent heater wires to maintain spacing between the two adjacent heater wires;
wherein an electrical current flowed through the plurality of heater wires inhibits ice accumulation on the rotor blade assembly.

2. The rotor blade assembly of claim 1, wherein the path is a curvilinear path.

3. The rotor blade assembly of claim 1, wherein the plurality of heater wires are grouped into a plurality of heater wire bundles with each of the heater wire bundle having one group of the heater wires, and each of the yarn threads loops around at least one of the heater wire bundles.

4. The rotor blade assembly of claim 3, further comprising, for each of the heater wire bundles, a nonconductive core separating the group of heater wires within the heater wire bundle.

5. The rotor blade assembly of claim 3, wherein the heater wire bundles extend in substantially parallel paths along a span of the rotor blade.

6. The rotor blade assembly of claim 1, further comprising a first buss bar disposed at an inboard end of the heater mat, the plurality of heater wires secured to the first buss bar.

7. The rotor blade assembly of claim 6, wherein the plurality of heater wires are secured to the first buss bar by ultrasonic welding.

8. The rotor blade assembly of claim 6, further comprising a second buss bar disposed at an outboard end of the heater mat, the plurality of heater wires secured to the second buss bar.

9. A heater mat for a rotor blade comprising:
a plurality of electrically conductive heater wires extending in a path along a span of the rotor blade;
a plurality of yarn thread knitted to the plurality of heater wires, each of the yarn threads looping around at least one of the plurality of heater wires; and
a warp thread disposed between two adjacent heater wires of the plurality of heater wires and knitted to adjacent pairs of the yarn threads without looping around the plurality of heater wires, each warp thread knitted to at least a first yarn thread wrapped around a first adjacent heater wire of the two adjacent heater wires and a second yarn thread wrapped around a second adjacent heater wire of the two adjacent heater wires to maintain spacing between the two adjacent heater wires;
wherein an electrical current flowed through the plurality of heater wires inhibits ice accumulation on the rotor blade assembly.

10. The heater mat of claim 9, wherein the path is a curvilinear path.

11. The heater mat of claim 9, wherein the plurality of heater wires are grouped into a plurality of heater wire bundles with each of the heater wire bundle having one group of the heater wires, and each of the yarn threads loops around at least one of the heater wire bundles.

12. The heater mat of claim 11, further comprising, for each of the heater wire bundles, a nonconductive core separating the group of heater wires within the heater wire bundle.

13. The heater mat of claim 11, wherein the heater wire bundles extend in substantially parallel paths along a span of the rotor blade.

14. The heater mat of claim 9, further comprising a first buss bar disposed at an inboard end of the heater mat, the plurality of heater wires secured to the first buss bar.

15. The heater mat of claim 14, wherein the plurality of heater wires are secured to the first buss bar by ultrasonic welding.

16. The heater mat of claim 14, further comprising a second buss bar disposed at an outboard end of the heater mat, the plurality of heater wires secured to the second buss bar.

17. A rotary winged aircraft comprising:
an airframe;
a drive system disposed at the airframe; and
a rotor assembly operably connected to the drive system, the rotor assembly including:
  a rotor hub; and
  a plurality of rotor blade assemblies extending from the rotor hub, a rotor blade assembly of the plurality of rotor blade assemblies including:
    a rotor blade; and
    a heater mat secured to the rotor blade, the heater mat including:
      a plurality of electrically conductive heater wires extending in a path along a span of the rotor blade;
      a plurality of yarn thread knitted to the plurality of heater wires, each of the yarn threads looping around at least one of the plurality of heater wires; and
      a warp thread disposed between two adjacent heater wires of the plurality of heater wires and knitted to adjacent pairs of the yarn threads without looping around the plurality of heater wires, each warp thread knitted to at least a first yarn thread wrapped around a first adjacent heater wire of the two adjacent heater wires and a second yarn thread wrapped around a second adjacent heater wire of the two adjacent heater wires to maintain spacing between the two adjacent heater wires;
    wherein an electrical current flowed through the plurality of heater wires inhibits ice accumulation on the rotor blade assembly.

18. The rotary winged aircraft of claim 17, wherein the heater wires are operably connected to an electrical power supply disposed at the airframe.

19. The rotary winged aircraft of claim 17, wherein the path is a curvilinear path.

20. The rotary winged aircraft of claim 17, wherein the plurality of heater wires are grouped into a plurality of heater wire bundles with each of the heater wire bundle having one group of the heater wires, and each of the yarn threads loops around at least one of the heater wire bundles.

21. The rotary winged aircraft of claim 20, further comprising, for each of the heater wire bundles, a nonconductive core separating the group of heater wires within the heater wire bundle.

22. The rotary winged aircraft of claim 20, wherein the heater wire bundles extend in parallel paths along a span of the rotor blade.

23. The rotary winged aircraft of claim 17, further comprising a first buss bar disposed at an inboard end of the heater mat, the plurality of heater wires secured to the first buss bar.

24. The rotary winged aircraft of claim 23, wherein the plurality of heater wires are secured to the first buss bar by ultrasonic welding.

25. The rotary winged aircraft of claim 23, further comprising a second buss bar disposed at an outboard end of the heater mat, the plurality of heater wires secured to the second buss bar.

* * * * *